US012559288B2

(12) United States Patent
Lin

(10) Patent No.: US 12,559,288 B2
(45) Date of Patent: Feb. 24, 2026

(54) VACUUM CUP LID WITH MULTI-ANGLE ADJUSTABLE MAGNETIC PHONE HOLDER

(71) Applicant: Qingwei Lin, Quanzhou (CN)

(72) Inventor: Qingwei Lin, Quanzhou (CN)

( * ) Notice: Subject to any disclaimer, the term of this patent is extended or adjusted under 35 U.S.C. 154(b) by 68 days.

(21) Appl. No.: 18/812,108

(22) Filed: Aug. 22, 2024

(65) Prior Publication Data

US 2026/0048913 A1     Feb. 19, 2026

(30) Foreign Application Priority Data

Aug. 15, 2024     (CN) ......................... 202421982453.4

(51) Int. Cl.
| | |
|---|---|
| *H04M 1/04* | (2006.01) |
| *A45F 3/16* | (2006.01) |
| *B65D 43/02* | (2006.01) |
| *B65D 51/24* | (2006.01) |
| *B65D 81/38* | (2006.01) |
| *H04M 1/12* | (2006.01) |
| *A45F 3/00* | (2006.01) |
| *F16M 13/02* | (2006.01) |

(52) U.S. Cl.
CPC ............... *B65D 51/24* (2013.01); *A45F 3/16* (2013.01); *B65D 43/0229* (2013.01); *B65D 81/3869* (2013.01); *A45F 2003/003* (2013.01); *B65D 2543/00092* (2013.01); *B65D 2543/0049* (2013.01); *F16M 13/022* (2013.01); *H04M 1/04* (2013.01)

(58) Field of Classification Search
CPC . A45F 3/16; A45F 2003/003; B65D 43/0229; B65D 51/24; B65D 81/3869; B65D 2313/04; B65D 2543/00092; B65D 2543/0049; F16M 11/041; F16M 11/2021; F16M 11/10; F16M 11/24; F16M 11/038; F16M 11/007; F16M 11/00; F16M 11/06; F16M 13/022; F16M 13/00; H04M 1/04; H04M 1/6075; H04M 1/12; H04M 1/13; H04M 1/21; H04M 2201/08
USPC ............................ 220/212; 248/371, 123.11
See application file for complete search history.

(56) References Cited

U.S. PATENT DOCUMENTS

| | | | | |
|---|---|---|---|---|
| 7,926,778 | B2 * | 4/2011 | Yen ..................... | F16M 11/2021 |
| | | | | 248/371 |
| 9,800,283 | B2 * | 10/2017 | Schmidt ............. | A45C 13/1069 |
| 11,338,971 | B1 * | 5/2022 | Capper ................. | B65D 51/24 |
| D1,015,072 | S * | 2/2024 | McClellan .................. | D7/392.1 |
| D1,027,933 | S * | 5/2024 | Zhou ........................... | D14/253 |

(Continued)

*Primary Examiner* — Gideon R Weinerth

(57) ABSTRACT

The present application discloses a vacuum cup lid with a multi-angle adjustable magnetic phone holder. A first bolt and a second bolt are separately used as rotating support pivot points at two ends of the roll-over rack, and the bottom support and the mounting rack are connected to form a double-shaft roll-over structure which, in combination with a rotating structure consisting of the mounting rack and the junction board, achieves a three-shaft adjusting supporting structure of a support ring and the annular magnet, which facilitates to adjust the support angle and orientation according to actual conditions, thereby improving the practicability of the product. In addition, the three-shaft adjustable supporting structure facilitates to adjust the height and the horizontal position of the support ring relative to the cup body, and prevents the cup body from affecting the support of a phone.

7 Claims, 6 Drawing Sheets

(56) References Cited

U.S. PATENT DOCUMENTS

| | | | | | |
|---|---|---|---|---|---|
| D1,034,623 S | * | 7/2024 | Yang | | D14/447 |
| D1,050,107 S | * | 11/2024 | Ma | | D14/253 |
| D1,052,575 S | * | 11/2024 | Sun | | D14/253 |
| D1,052,954 S | * | 12/2024 | Lin | | D7/392.1 |
| D1,073,440 S | * | 5/2025 | Alves | | D8/349 |
| D1,073,661 S | * | 5/2025 | Hong | | D12/415 |
| D1,076,905 S | * | 5/2025 | Lan | | D12/415 |
| D1,089,177 S | * | 8/2025 | Hu | | D14/253 |
| D1,101,739 S | * | 11/2025 | Deng | | D14/253 |
| 12,467,580 B1 | * | 11/2025 | Zhi | | A61L 9/042 |
| 2018/0228280 A1 | * | 8/2018 | Li | | B65D 51/24 |
| 2019/0063667 A1 | * | 2/2019 | Law | | H04M 1/04 |
| 2019/0195417 A1 | * | 6/2019 | Kwasniewski | | F16M 11/2064 |
| 2020/0063915 A1 | * | 2/2020 | Lederer | | F16M 13/04 |
| 2021/0307187 A1 | * | 9/2021 | Pan | | F16M 11/26 |
| 2022/0099241 A1 | * | 3/2022 | Ho | | F16M 11/2042 |
| 2022/0212608 A1 | * | 7/2022 | McSweyn | | B60R 11/02 |
| 2022/0407553 A1 | * | 12/2022 | Phelan | | H04B 1/3877 |
| 2023/0291822 A1 | * | 9/2023 | Liu | | G06F 1/1686 |
| 2023/0403352 A1 | * | 12/2023 | Alves | | H04B 1/3877 |
| 2024/0052968 A1 | * | 2/2024 | Green | | F16M 11/10 |
| 2024/0148129 A1 | * | 5/2024 | Wang | | A45F 3/16 |
| 2024/0151346 A1 | * | 5/2024 | Lu | | A45F 3/16 |
| 2024/0154469 A1 | * | 5/2024 | Lu | | H02J 50/10 |
| 2024/0225329 A1 | * | 7/2024 | Lobato | | A47G 23/0241 |
| 2024/0328569 A1 | * | 10/2024 | He | | H02J 50/402 |
| 2024/0388318 A1 | * | 11/2024 | Kieley | | H04B 1/3877 |
| 2024/0410516 A1 | * | 12/2024 | Lo | | F16M 11/2007 |
| 2025/0067389 A1 | * | 2/2025 | Fan | | F16M 13/022 |
| 2025/0214756 A1 | * | 7/2025 | Raymus | | B65D 23/10 |
| 2025/0289632 A1 | * | 9/2025 | Lu | | A47G 19/2272 |

* cited by examiner

VACUUM CUP LID WITH MULTI-ANGLE ADJUSTABLE MAGNETIC PHONE HOLDER

CROSS-REFERENCE TO RELATED APPLICATIONS

This application claims priority to Chinese Patent Application No. 202421982453.4, filed on Aug. 15, 2024, which is hereby incorporated by reference in its entirety.

TECHNICAL FIELD

The present application relates to the field of magnetic cup lid technologies, and in particular to a vacuum cup lid with a multi-angle adjustable magnetic phone holder.

BACKGROUND

The vacuum cup is a common drinking water container in daily life, and a main function of the vacuum cup is to keep the temperature of water. Whether the water is hot or cold, the original temperature thereof can be kept for a certain period of time. With changing market requirements, the designs and functions of the vacuum cup are becoming increasingly diversified, among which a design where a magnetic holder is mounted on the cup lid is included. Such a design structure can fix electronic products such as phones through magnetic force, so as to meet individualized requirements of users and improve the user experience. The existing magnetic holder structures mounted on the cup lid of the vacuum cup can generally meet requirements in daily use, but the magnetic holders provided with the magnet are mostly rotatably supported on the racks at a side of the top of the cup lids by rotating shafts. Such a supporting structure only has a single roll-over adjusting structure, and the angle and orientation of support adjustment are limited, such that the practicability of the product is affected. In addition, the original design can only be adapted to a thin cup body. When the design is used on a fat cup body, such as BOTTLED JOY or an auto cup which is popular at present, the phone cannot be placed perpendicular to the ground for support due to the limitation of the dimension of the cup body, such that the user experience is affected. Therefore, it is necessary to design a vacuum cup lid with a multi-angle adjustable magnetic phone holder.

SUMMARY

The present application intends to provide a vacuum cup lid with a multi-angle adjustable magnetic phone holder to solve the problems that the existing magnetic holder structures mounted on the cup lid of the vacuum cup can generally meet requirements in daily use, but the magnetic holders provided with the magnet are mostly rotatably supported on the racks at a side of the top of the cup lids by rotating shafts; such a supporting structure only has a single roll-over adjusting structure, and the angle and orientation of support adjustment are limited, such that the practicability of the product is affected; in addition, the original design can only be adapted to a thin cup body; when the design is used on a fat cup body, such as BOTTLED JOY or an auto cup which is popular at present, the phone cannot be placed perpendicular to the ground for support due to the limitation of the dimension of the cup body, such that the user experience is affected.

In order to solve the above technical problems, the present application provides the following technical solution. The present application provides a vacuum cup lid with a multi-angle adjustable magnetic phone holder, including a bottom threaded section, a roll-over rack, a mounting rack, a junction board, ejector beads, springs, and an annular magnet, where a bottom support is provided at a side of the top of the bottom threaded section, a first hexagonal sleeve pipe is sleeved in the bottom support, a first bolt is sleeved in the first hexagonal sleeve pipe, the first bolt is sleeved on one end of the roll-over rack, a second hexagonal sleeve is sleeved in the other end of the roll-over rack, a second bolt is sleeved in the second hexagonal sleeve that is sleeved on the mounting rack, and the mounting rack is rotatably connected to the bottom of the junction board.

As a further technical solution of the present application, one end of the first bolt is fitted with a first nut through threads, and the first nut and the first bolt are separately pressed against the roll-over rack.

As a further technical solution of the present application, one end of the second bolt is fitted with a second nut through threads, and the second nut and the second bolt are both pressed against the mounting rack.

As a further technical solution of the present application, support shells are symmetrically provided at the top of the bottom threaded section, and the support shells are fitted and engaged in a closed shell.

As a further technical solution of the present application, the ejector beads are fitted in locking grooves formed in the bottom of the junction board, the ejector beads are fixed to top ends of the springs, and the springs are embedded in grooves symmetrically formed in the top of the mounting rack.

As a further technical solution of the present application, the junction board is fixed on a support ring, an annular groove is formed in the top of the support ring, and the annular magnet is sleeved in the annular groove.

As a further technical solution of the present application, a closed ring is sleeved at the top of the support ring, and the bottom of the closed ring is attached to the annular magnet.

The vacuum cup lid with a multi-angle adjustable magnetic phone holder provided in the present application has the following advantages. A first bolt and a second bolt are separately used as rotating support pivot points at two ends of the roll-over rack, and the bottom support and the mounting rack are connected to form a double-shaft roll-over structure which, in combination with a rotating structure consisting of the mounting rack and the junction board, achieves a three-shaft adjusting supporting structure of a support ring and the annular magnet, which facilitates to adjust the support angle and orientation according to actual conditions, thereby improving the practicability of the product. In addition, the three-shaft adjustable supporting structure facilitates to adjust the height and the horizontal position of the support ring relative to the cup body, and prevents the cup body from affecting the support of a phone, such that the phone can be placed perpendicular to the ground for support even if the product is used with a large-dimension cup body, which improves the user experience.

BRIEF DESCRIPTION OF DRAWINGS

In order to illustrate the technical solutions in the embodiments of the present application or in the related art more clearly, the following briefly introduces the accompanying drawings for describing the embodiments or the related art. Apparently, the drawings in the following description show some embodiments of the present application, and a person of ordinary skill in the art may still derive other drawings from the drawings without creative efforts.

Figure 1:
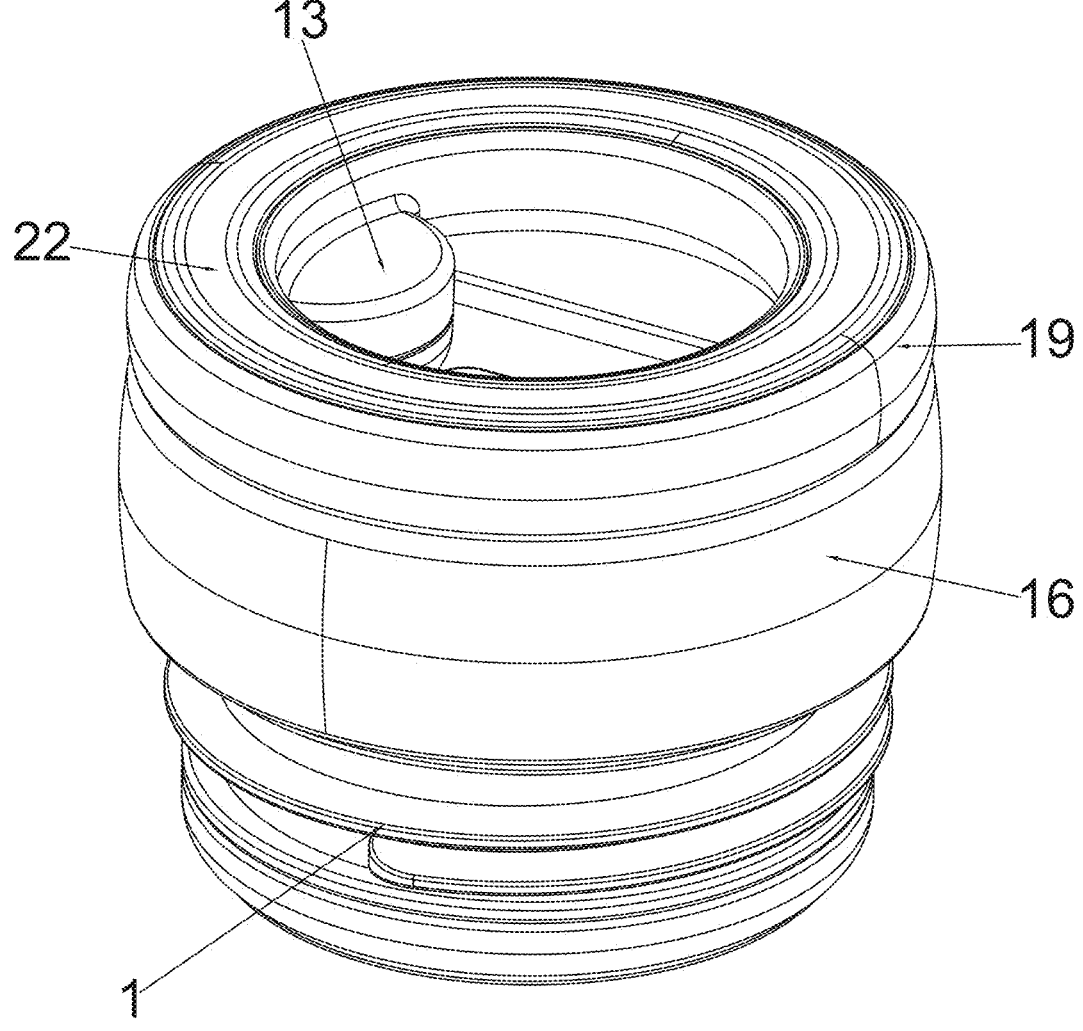
FIG. 1 is a three-dimensional structural diagram of the overall structure of the present application.
Figure 2:
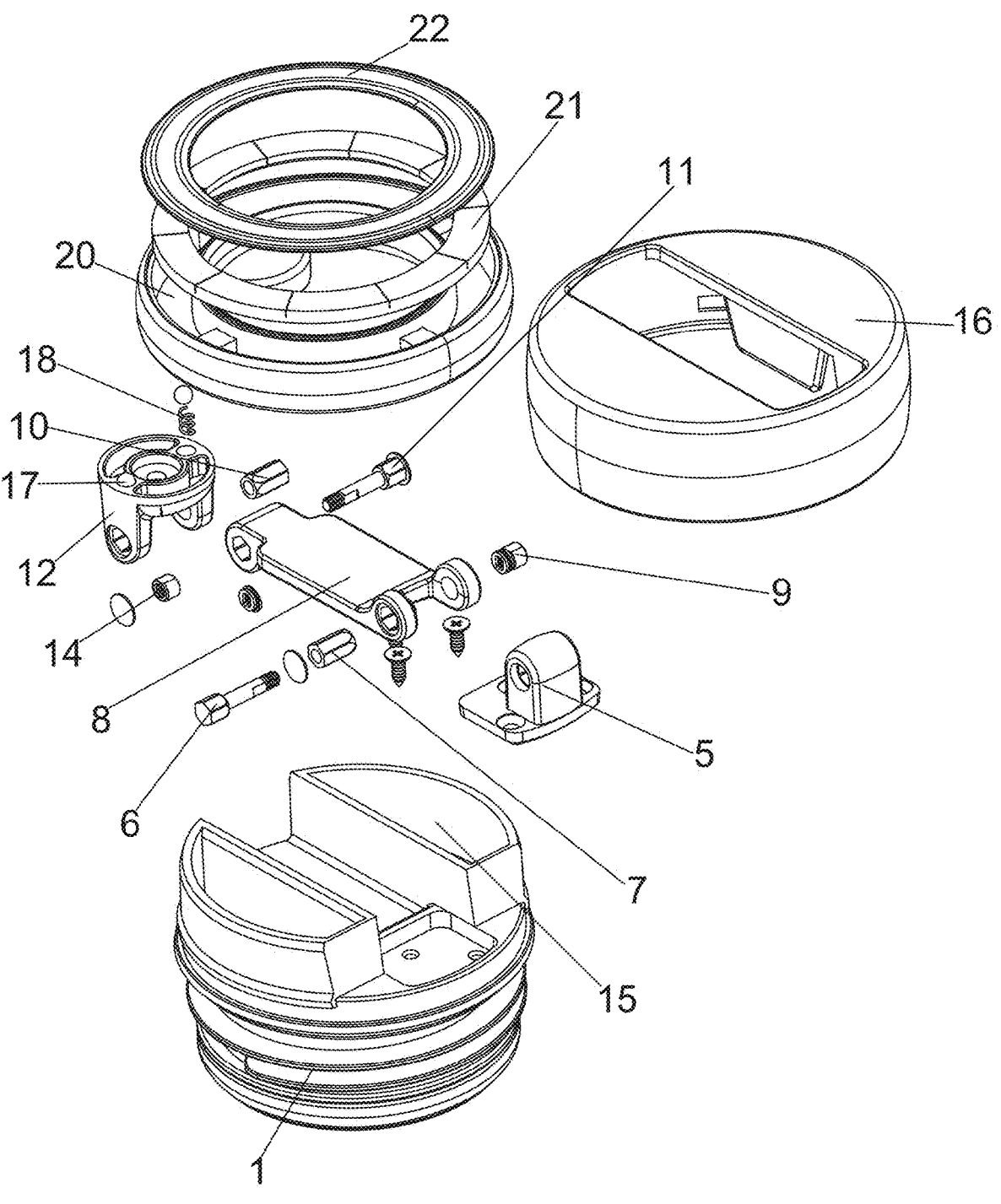
FIG. 2 is an exploded schematic diagram of the overall structure of the present application.
Figure 3:
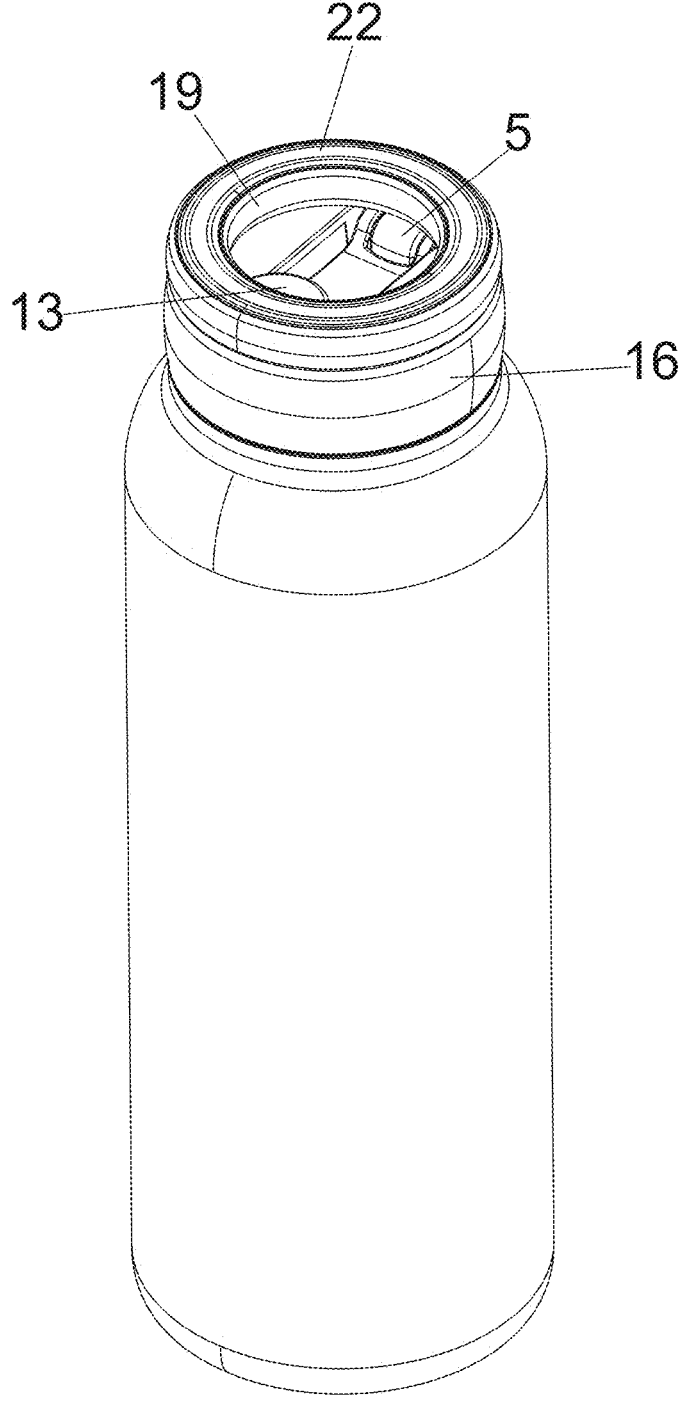
FIG. 3 is a structural schematic diagram of a cup lid in a storage state of the present application.

In the drawings: 1, bottom threaded section; 5, bottom support; 6, first bolt; 7, first hexagonal sleeve pipe; 8, roll-over rack; 9, first nut; 10, second hexagonal sleeve; 11, second bolt; 12, mounting rack; 13, junction board; 14, second nut; 15, support shell; 16, closed shell; 17, ejector bead; 18, spring; 19, support ring; 20, annular groove; 21, annular magnet; and 22, closed ring.

DETAILED DESCRIPTION OF THE EMBODIMENTS

For clearer descriptions of the objectives, technical solutions, and advantages of the embodiments of the present application, the technical solutions in the embodiments of the present application are clearly and completely described below with reference to the accompanying drawings of the embodiments of the present application. Apparently, the described embodiments are merely some embodiments of the present application, rather than all of the embodiments. Based on the embodiments of the present application, all other embodiments obtained by those of ordinary skill in the art without creative work shall fall within the protection scope of the present application.

In the description of the present application, it should be noted that, unless otherwise explicitly specified or defined, the term "mounted", "connected", or "linked" should be construed in its broad sense, and may be, for example, fixedly connected, detachably connected, or integrally connected; may be mechanically or electrically connected; may be connected directly or indirectly through an intermediate, or communicated between interiors of two elements. The specific meanings of the above terms in the present application can be understood according to specific situations by those of ordinary skill in the art.

Referring to FIGS. 1-6, an embodiment provided in the present application includes: a vacuum cup lid with a multi-angle adjustable magnetic phone holder, including a bottom threaded section 1, a roll-over rack 8, a mounting rack 12, a junction board 13, ejector beads 17, springs 18, and an annular magnet 21, where a bottom support 5 is provided at a side of the top of the bottom threaded section 1, a first hexagonal sleeve pipe 7 is sleeved in the bottom support 5, a first bolt 6 is sleeved in the first hexagonal sleeve pipe 7, the first bolt 6 is sleeved on one end of the roll-over rack 8, a second hexagonal sleeve 10 is sleeved in the other end of the roll-over rack 8, a second bolt 11 is sleeved in the second hexagonal sleeve 10 that is sleeved on the mounting rack 12, and the mounting rack 12 is rotatably connected to the bottom of the junction board 13; one end of the first bolt 6 is fitted with a first nut 9 through threads, and the first nut 9 and the first bolt 6 are separately pressed against the roll-over rack 8; one end of the second bolt 11 is fitted with a second nut 14 through threads, and the second nut 14 and the second bolt 11 are both pressed against the mounting rack 12; support shells 15 are symmetrically provided at the top of the bottom threaded section 1, and the support shells 15 are fitted and engaged in a closed shell 16;

the ejector beads 17 are fitted in locking grooves formed in the bottom of the junction board 13, the ejector beads 17 are fixed to top ends of the springs 18, and the springs 18 are embedded in grooves symmetrically formed in the top of the mounting rack 12; the junction board 13 is fixed on a support ring 19, an annular groove 20 is formed in the top of the support ring 19, and the annular magnet 21 is sleeved in the annular groove 20; a closed ring 22 is sleeved at the top of the support ring 19, and the bottom of the closed ring 22 is attached to the annular magnet 21, and the closed ring 22 is used for closing the annular groove 20 at the top of the support ring 19 to prevent the annular magnet 21 from falling off from the annular groove 20 in the using process.

Figure 4:
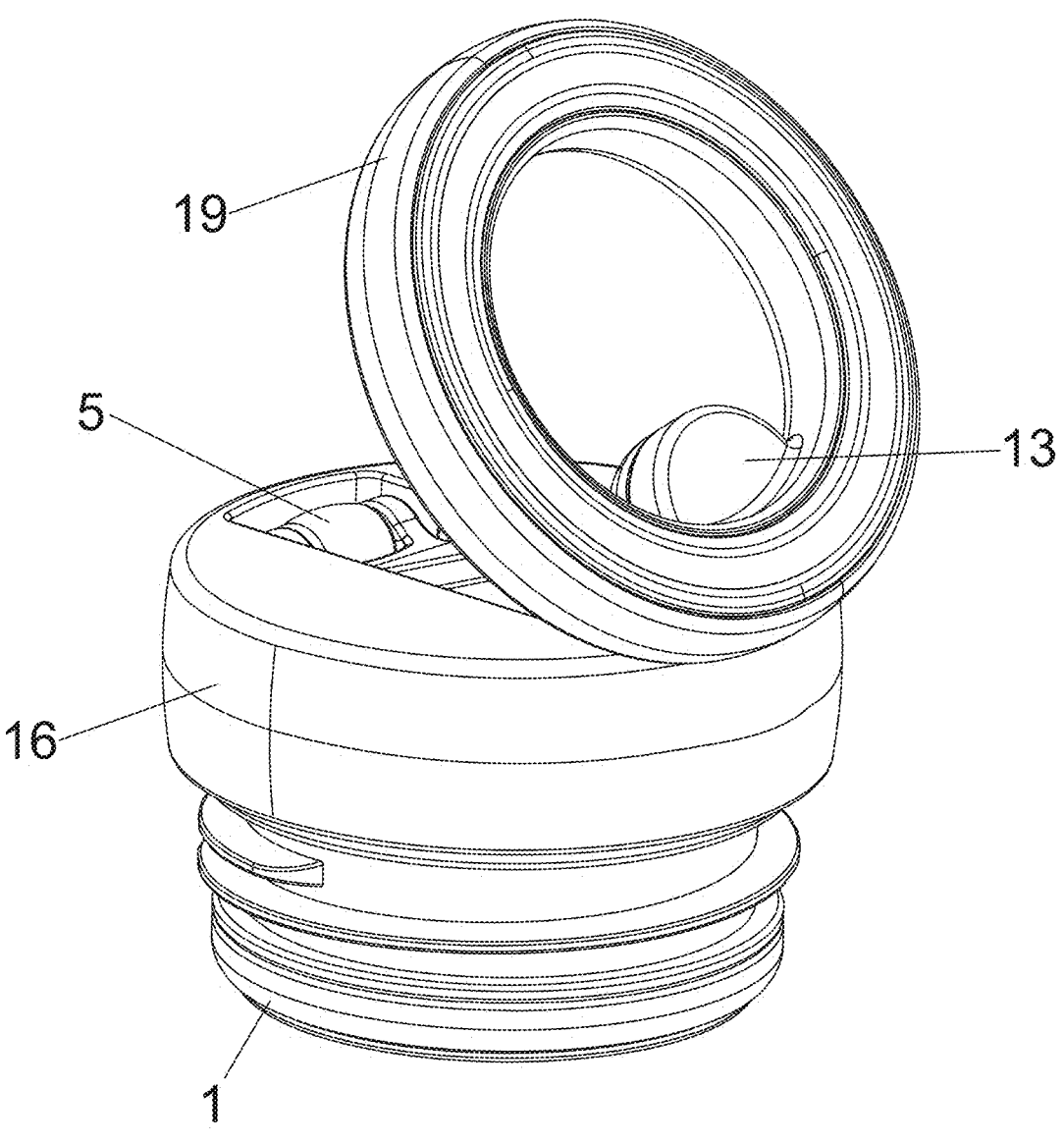
FIGS. 4-6 all show supporting postures schematic diagram of the present application when it is used.
Figure 5:
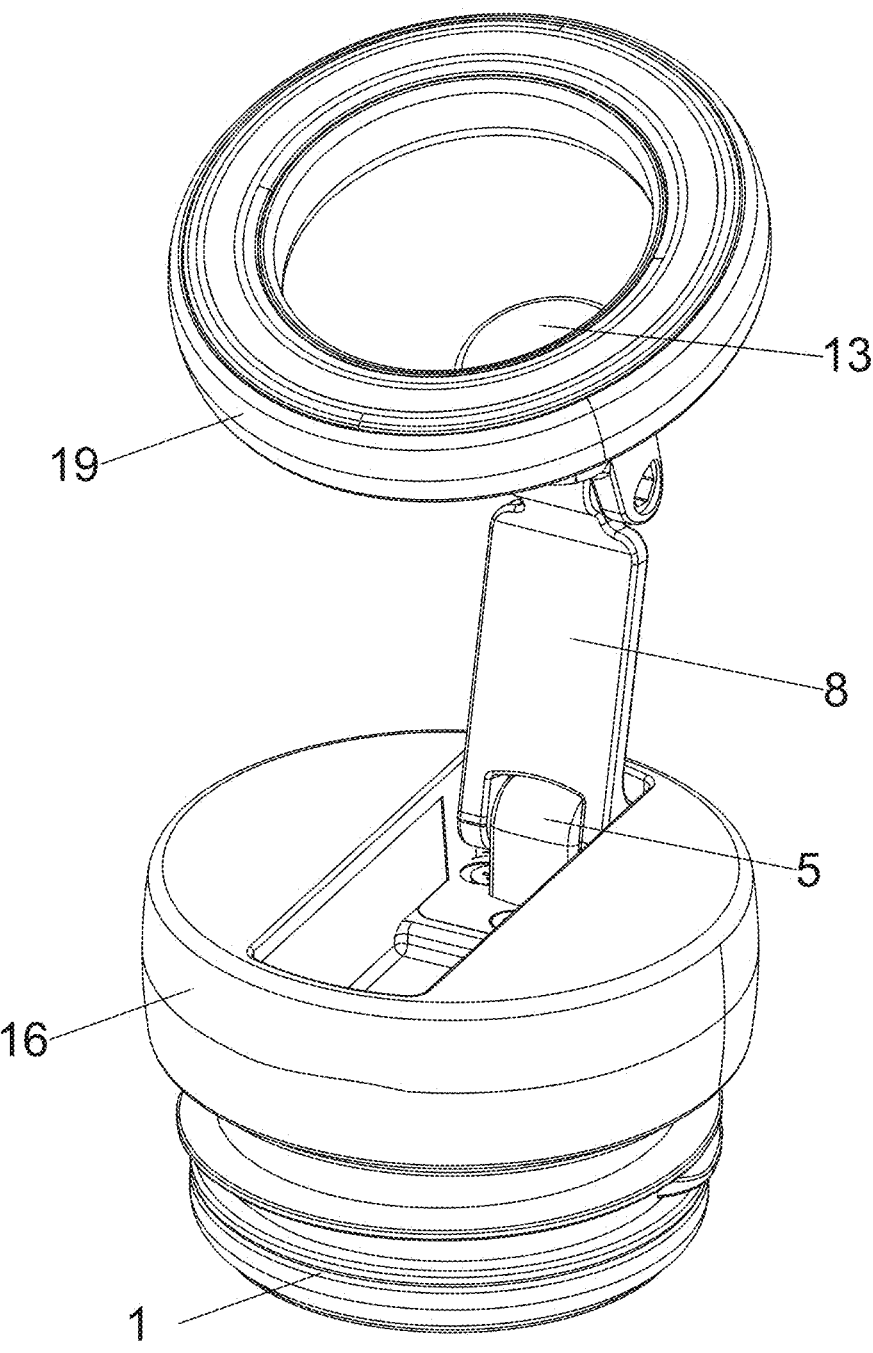
Figure 6:
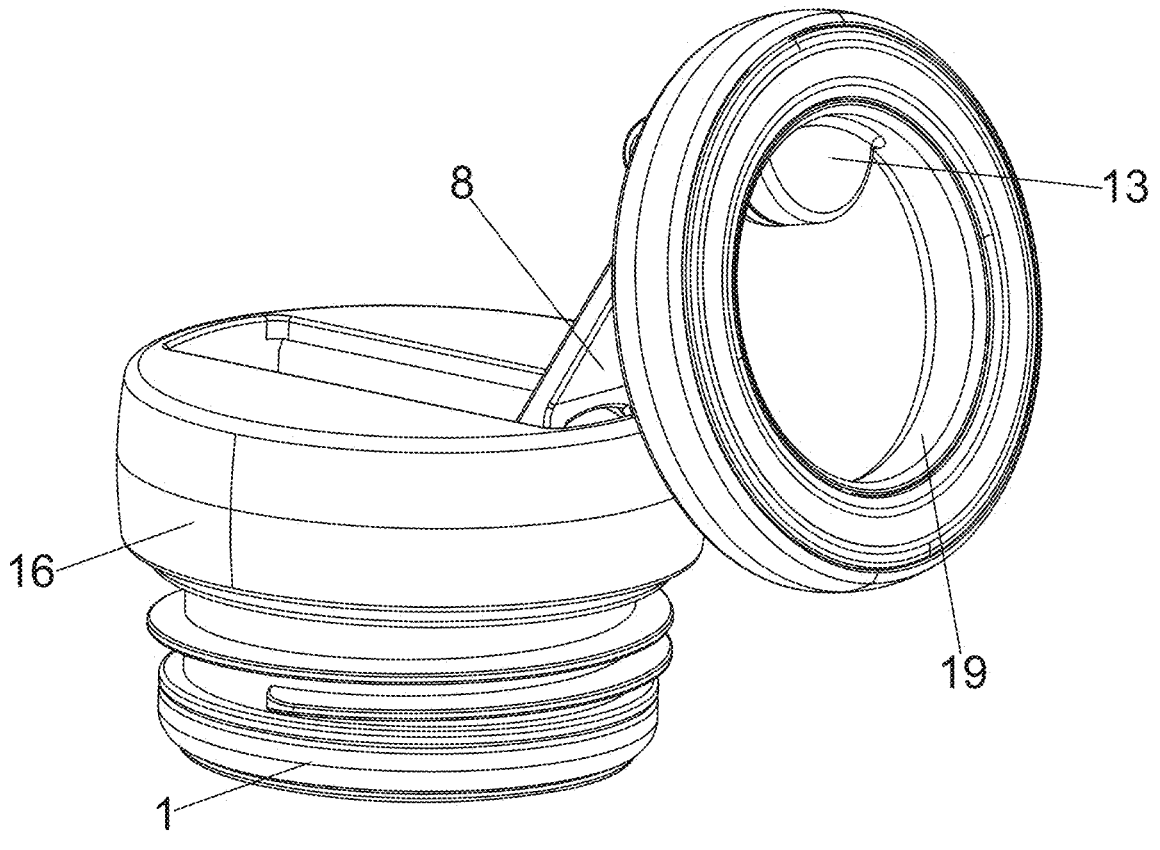

Specifically, in use, the first bolt 6 and the second bolt 11 are separately used as rotating support pivot points at two ends of the roll-over rack 8, and the bottom support 5 and the mounting rack 12 are connected to form a double-shaft roll-over structure which, in combination with a rotating structure consisting of the mounting rack 12 and the junction board 13, achieves a three-shaft adjusting supporting structure of the support ring 19 and the annular magnet 21, which can adjust multiple postures as shown in FIGS. 4-6 and facilitate to adjust the support angle and orientation according to actual conditions, thereby improving the practicability of the product. The support shells 15 symmetrically provided at the top of the bottom threaded section 1 provide folding spaces of the three-shaft adjusting supporting structure, the support ring 19 is attached to the top of the closed shell 16 in a folded state, and the mounting rack 12 and the roll-over rack 8 are accommodated between the support shells 15, such that the integral attractiveness is guaranteed. In addition, the three-shaft adjustable supporting structure facilitates to adjust the height and the horizontal position of the support ring 19 relative to the cup body, and prevents the cup body from affecting the support of a phone, such that the phone can be placed perpendicular to the ground for support even if the product is used with a large-dimension cup body, which improves the user experience.

In the description of the present application, it should be noted that, unless otherwise explicitly specified or defined, the term "mounted", "connected", or "linked" should be construed in its broad sense, and may be, for example, fixedly connected, detachably connected, or integrally connected; may be mechanically or electrically connected; may be connected directly or indirectly through an intermediate, or communicated between interiors of two elements. The specific meanings of the above terms in the present application can be understood according to specific situations by those of ordinary skill in the art.

The apparatus embodiment described above is merely illustrative, where the units described as separate components may or may not be physically separated, and components displayed as units may or may not be physical units; i.e., they may be located in one position, or may be distributed on multiple network units. Some or all of the modules can be selected according to actual needs to achieve the purpose of the solutions of the embodiments. Those of ordinary skilled in the art can understand and implement without inventive effort.

Finally, it should be noted that the above embodiments are only used to illustrate the technical solutions of the present application, but not to limit them; although the present application has been described in detail with reference to the foregoing embodiments, those of ordinary skill in the art should understand that they can still modify the technical solutions recorded in the foregoing embodiments, or make equivalent substitutions for some of the technical features;

and these modifications or substitutions do not make the essence of the corresponding technical solutions deviate from the spirit and scope of the technical solutions in the embodiments of the present application.

What is claimed is:

1. A vacuum cup lid with a multi-angle adjustable magnetic phone holder, comprising a bottom threaded section, a roll-over rack, a mounting rack, a junction board, ejector beads, springs, and an annular magnet, wherein a bottom support is provided at a side of the top of the bottom threaded section, a first hexagonal sleeve pipe is sleeved in the bottom support, a first bolt is sleeved in the first hexagonal sleeve pipe, the first bolt is sleeved on one end of the roll-over rack, a second hexagonal sleeve is sleeved in the other end of the roll-over rack, a second bolt is sleeved in the second hexagonal sleeve that is sleeved on the mounting rack, and the mounting rack is rotatably connected to the bottom of the junction board.

2. The vacuum cup lid with a multi-angle adjustable magnetic phone holder according to claim 1, wherein one end of the first bolt is fitted with a first nut through threads, and the first nut and the first bolt are separately pressed against the roll-over rack.

3. The vacuum cup lid with a multi-angle adjustable magnetic phone holder according to claim 1, wherein one end of the second bolt is fitted with a second nut through threads, and the second nut and the second bolt are both pressed against the mounting rack.

4. The vacuum cup lid with a multi-angle adjustable magnetic phone holder according to claim 1, wherein support shells are symmetrically provided at the top of the bottom threaded section, and the support shells are fitted and engaged in a closed shell.

5. The vacuum cup lid with a multi-angle adjustable magnetic phone holder according to claim 1, wherein the ejector beads are fitted in locking grooves formed in the bottom of the junction board, the ejector beads are fixed to top ends of the springs, and the springs are embedded in grooves symmetrically formed in the top of the mounting rack.

6. The vacuum cup lid with a multi-angle adjustable magnetic phone holder according to claim 5, wherein the junction board is fixed on a support ring, an annular groove is formed in the top of the support ring, and the annular magnet is sleeved in the annular groove.

7. The vacuum cup lid with a multi-angle adjustable magnetic phone holder according to claim 6, wherein a closed ring is sleeved at the top of the support ring, and the bottom of the closed ring is attached to the annular magnet.

* * * * *